United States Patent [19]

Konoike et al.

[11] Patent Number: 5,028,348
[45] Date of Patent: Jul. 2, 1991

[54] MAGNETIC MATERIAL FOR HIGH FREQUENCIES

[75] Inventors: Takehiro Konoike; Kunishaburo Tomono, both of Kyoto, Japan

[73] Assignee: Murata Manufacturing Co., Ltd., Japan

[21] Appl. No.: 452,704

[22] Filed: Dec. 19, 1989

[30] Foreign Application Priority Data

Dec. 19, 1988 [JP] Japan .................................. 63-321331
May 16, 1989 [JP] Japan .................................. 1-123565
Jun. 15, 1989 [JP] Japan .................................. 1-153128

[51] Int. Cl.⁵ .............................................. C04B 35/26
[52] U.S. Cl. ............................. 252/62.61; 252/62.58; 252/62.59; 252/62.63
[58] Field of Search ............... 252/62.58, 62.59, 62.61, 252/62.62, 62.63

[56] References Cited

U.S. PATENT DOCUMENTS

| | | |
|---|---|---|
| 3,096,288 | 7/1963 | Sarakauskas et al. ............. 252/62.61 |
| 3,372,122 | 3/1968 | Lessoff .............................. 252/62.61 |
| 3,609,084 | 9/1971 | Loye ................................. 252/62.61 |
| 3,837,910 | 9/1974 | Van der Laan et al. ......... 252/62.63 |
| 4,540,500 | 9/1985 | Torii et al. ........................ 252/62.61 |

FOREIGN PATENT DOCUMENTS 47-29896 11/1972 Japan .................................. 252/62.61
400916 2/1974 U.S.S.R. ............................ 252/62.61

Primary Examiner—Jack Cooper
Attorney, Agent, or Firm—Ostrolenk, Faber, Gerb & Soffen

[57] ABSTRACT

A magnetic material for mircowave and millimeter wave frequencies consists essentially of a basic composition and at least one additive incorporated therein, the basic composition being represented by the general formula:

$$Li_xFe_yTi_zO_{0.5+y+1.5z}$$

where x, y and z are mole fractions of three components and each takes a value within the following respective ranges, $0.15 \leq x \leq 0.30$, $0.55 \leq y \leq 0.85$, $0 \leq z \leq 0.30$, and $x+y+z=1.00$, and the additive being at least one oxide selected from the group consisting of lead oxide, vanadium oxide, boron oxide and silicon oxide. The content of the additive ranges from not less than 0.01 mol % to not more than 1.0 mol % in terms of PbO, $V_2O_5$, $B_2O_3$ and $SiO_2$, respectively.

1 Claim, 1 Drawing Sheet

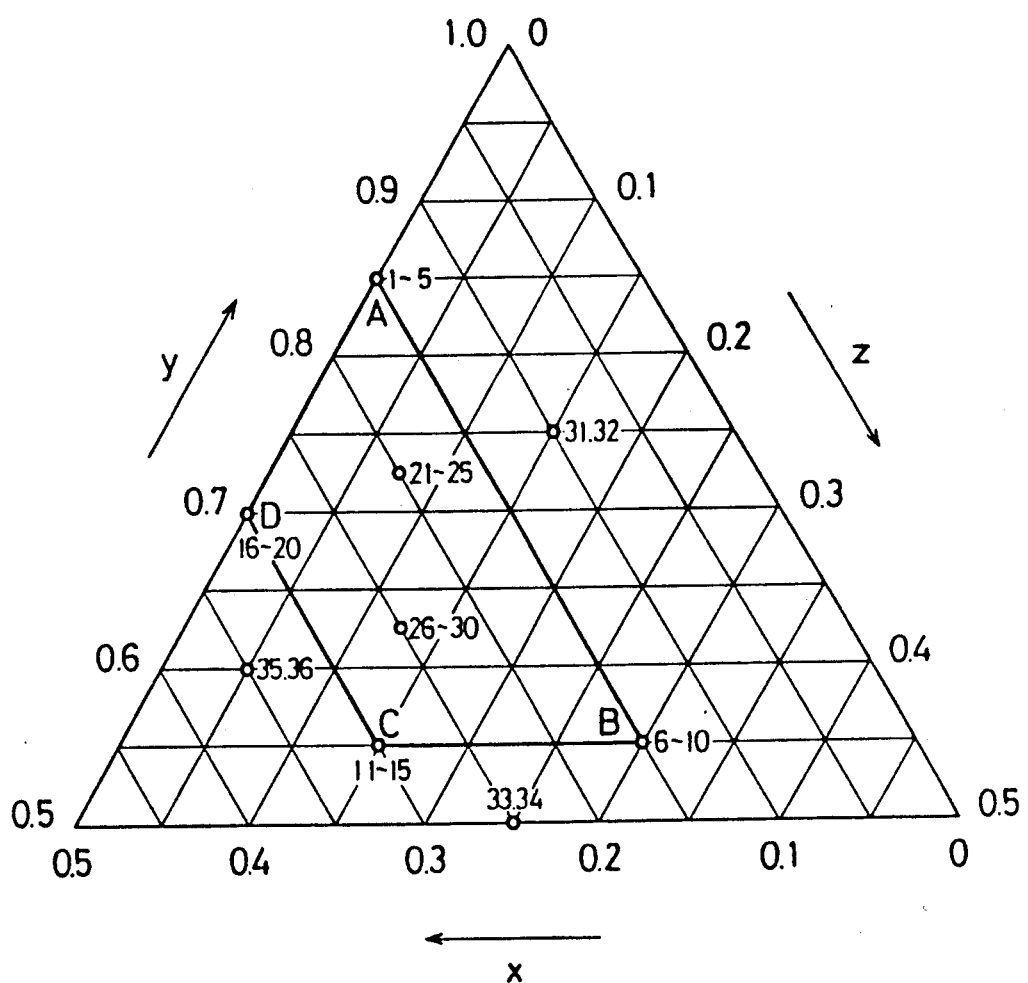

MAGNETIC MATERIAL FOR HIGH FREQUENCIES

BACKGROUND OF THE INVENTION

1. Field of the invention

The present invention relates to a magnetic material for high frequencies and, more particularly, to a magnetic ceramic composition for high frequency circuit elements designed for use in the microwave and millimeter wave frequency ranges.

2. Description of the Prior Art

As a magnetic material for high frequencies, there have been used materials such as Mn-Mg ferrites, Ni-Zn ferrites, YIG ferrites, lithium ferrites these materials are highly advantage in that they have high saturation magnetization ($4\pi M_s$) ranging from 500 to 4000 gauss. Among them, lithium ferrite has the greatest potential for use in the production of highly stable circuit elements such as isolators and circulators. This is because lithium ferrite, has a large saturation magnetization of about 3700 gauss, a high Curie temperature (Tc) of about 650° C., and a small temperature coefficient of saturation magnetization at room temperature.

However, lithium ferrite has some disadvantages such that it measures large losses in the ferromagnetic resonance line width ($\Delta H$) and the dielectric loss tangent (tan $\delta e$) as compared with the other ferrite materials used in the construction of microwave and millimeter wave frequencies. For example, pure lithium ferrite, $Li_{0.5}Fe_{2.5}O_4$, has a large value of the ferromagnetic resonance line width ($\Delta H$) of more than 500 Oersted and a dielectric loss tangent (tan $\delta e$) of more than 0.01 at 10 GHz. These properties make it impossible to use as a magnetic material for practical circuit elements for microwave and millimeter wave frequencies.

SUMMARY OF THE INVENTION

It is therefore an object of the present invention to provide a magnetic material for high frequencies a small ferromagnetic resonance line width ($\Delta H$) and a small dielectric loss tangent (tan $\delta e$).

Another object of the present invention is to provide a magnetic material for microwave and millimeter wave frequencies with a ferromagnetic resonance line width ($\Delta H$) of not more than 500 Oersted, and dielectric loss tangent (tan $\delta e$) of not more than 0.01 at 10 GHz.

Still another object of the present invention is to provide a ferrite composition for microwave and millimeter wave frequencies having an improved ferromagnetic resonance line width ($\Delta H$) and dielectric loss tangent (tan $\delta e$) and a high Curie temperature which makes it possible to obtain any desired value of the saturation magnetization ranging from about 600 to about 3700 gauss.

These and other objects are solved by incorporating a certain amount of one or two oxides selected from the group consisting of lead oxide, vanadium oxide, boron oxide and silicon oxide, into a lithium ferrite or titanium modified lithium ferrite.

DETAILED DESCRIPTION OF THE INVENTION

According to the present invention, there is provided a magnetic material for microwave and millimeter wave frequencies consisting essentially of a basic composition and containing at least one additive incorporated therein, said basic composition being represented by the general formula:

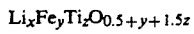
$Li_xFe_yTi_zO_{0.5+y+1.5z}$ where x, y and z are mole fractions of three components and each takes a value within the following respective ranges, $0.15 \leq x \leq 0.30$, $0.55 \leq y \leq 0.85$, $0 \leq z \leq 0.30$, and $x+y+z=1.00$, said additive being at least one oxide selected from the group consisting of lead oxide, vanadium oxide, boron oxide and silicon oxide, the content of said additive ranging from not less than 0.01 mol % to not more than 1.0 mol % in terms of PbO, $V_2O_5$, $B_2O_3$ and $SiO_2$, respectively.

In a preferred embodiment, at least one additive is lead oxide and is incorporated into the basic composition in an amount of 0.01 to 0.5 mol% in terms of PbO.

In another preferred embodiment, the additive is vanadium oxide and is incorporated into the basic composition in an amount of 0.01 to 1.0 mol% in terms of $V_2O_5$.

In still another embodiment, $B_2O_3$ and/or $SiO_2$ are used as the additive and are incorporated into the basic composition in an amount of 0.02 to 1.0 mol %.

Thus, according to the present invention, there is provided a magnetic material for microwave and millimeter wave frequencies consisting essentially of a basic composition and lead oxides incorporated therein, said basic composition having a composition represented by the general formula:

$Li_xFe_yTi_zO_{0.5+y+1.5z}$ where x, y and z are mole fractions of three components and each takes a value within the following respective ranges, $0.15 \leq x \leq 0.30$, $0.55 \leq y \leq 0.85$, $0 \leq z \leq 0.30$, and $x+y+z=1.00$, the content of lead oxide being 0.01 to 0.5 mol % in terms of PbO.

Also, there is provided a magnetic material for microwave and millimeter wave frequencies consisting essentially of a basic composition and vanadium oxides incorporated therein, said basic composition having a composition represented by the general formula:

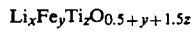
$Li_xFe_yTi_zO_{0.5+y+1.5z}$ where x, y and z are mole fractions of three components and each takes a value within the following respective ranges, $0.15 \leq x \leq 0.30$, $0.55 \leq y \leq 0.85$, $0 \leq z \leq 0.30$, and $x+y+z=1.00$, the content of vanadium oxide being 0.01 to 1.0 mol % in terms of $V_2O_5$.

According to the present invention, there is further provided a magnetic material for microwave and millimeter wave frequencies consisting essentially of a basic composition and $B_2O_3$ and/or $SiO_2$ incorporated therein, said basic composition having a composition represented by the general formula:

$Li_xFe_yTi_zO_{0.5+y+1.5z}$ where x, y and z are mole fractions of three components and each takes a value within the following respective ranges, $0.15 \leq x \leq 0.30$, $0.55 \leq y \leq 0.85$, $0 \leq z \leq 0.30$, and $x+y+z=1.00$, the content of $B_2O_3$ and/or $SiO_2$ being 0.02 to 1.0 mol %.

The basic composition of the present invention has a composition falling within a quadrangular area defined by the points A, B, C and D in the ternary phase diagram of the attached FIGURE. The mole fractions of the three components at the above points are as follows:

|   | x    | y    | z    |
|---|------|------|------|
| A | 0.15 | 0.85 | 0.00 |
| B | 0.15 | 0.55 | 0.30 |
| C | 0.30 | 0.55 | 0.15 |
| D | 0.30 | 0.70 | 0.00 |

The reasons why the magnetic material of the present invention has been limited to those having the above composition are as follows.

If the mole fraction of Li, i.e., x, is less than 0.15, or if the mole fraction of Li, x, is more than 0.30, the magnetic resonance line width ($\Delta H$) and dielectric loss tangent ($\tan \delta e$) become large.

If the mole fraction of Fe, i.e., y, is less than 0.55, the ferromagnetic resonance line width ($\Delta H$) and dielectric loss tangent ($\tan \delta e$) become large and the Curie temperature becomes lowered resulting in an increase of the temperature coefficient of saturation magnetization. If the mole fraction of Fe, y, is more than 0.85, the magnetic resonance line width ($\Delta H$) and dielectric loss ($\tan \delta e$) become large. The content of the additive has been limited to a value within the above respective range for the following reasons.

If the added amount of the additive is less than 0.01 mol %, the ferromagnetic resonance line width ($\Delta H$) and dielectric loss tangent ($\tan \delta e$) become too large, thus making it impossible to put the magnetic material into practical applications. If the added amount of the additive is more than 0.5 mol %, the dielectric loss tangent ($\tan \delta e$) becomes large.

In order to obtain any desired value of the saturation magnetization ($4\pi Ms$) ranging from 600 to 3700 gauss, a part of Fe in lithium ferrite may be replaced with titanium oxide. However, if the mole fraction of titanium in the basic composition exceeds 0.30, saturation magnetization ($4\pi Ms$) becomes too small.

The magnetic material of the present invention possesses a ferromagnetic resonance line width ($\Delta H$) of not more than 500 Oersted, a (dielectric loss tangent ($\tan \delta e$) of not more than 0.01 at 10 GHz, and a saturation magnetization ($4\pi Ms$) ranging from 600 to 3700 gauss. The magnetic material has high Curie temperature, and, therefore, therefore possesses a small temperature coefficient of the saturation magnetization.

Varying the three components of the basic composition makes it possible to obtain any value of the saturation magnetization ($4\pi Ms$) ranging from 600 to 3700 gauss. This makes it possible to produce microwave and millimeter wave circuit elements with a magnetic material having the saturation magnetization most pertinent for the operating frequency of the circuit elements.

These objects, features and advantages of the present invention will be further explained with reference to the following examples and accompanying drawings.

BRIEF EXPLANATION OF THE DRAWINGS

The drawing is a ternary phase diagram of a system, $Li_xFe_yTi_zO_{0.5+y+1.5z}$, showing the compositional area of the magnetic material according to the present invention.

EXAMPLE 1

Using highly purified $Li_2CO_3$, $Fe_2O_3$, $TiO_2$ and PbO as raw materials, specimen were prepared in the following manner. These raw materials were weighed so as to have a composition as shown in Table 1 and mixed by a wet process for 16 hours with a ball mill using ethyl alcohol as a dispersing medium. The resulting slurry was dried, calcined at 850 °C. for 2 hours, and then grounded together with ethyl alcohol and an organic binder by means of a ball mill. The resultant powder was passed through a 50 mesh sieve to prepare granulated powder. The resultant powder was formed into a square rod of a size of 3 mm × 3 mm × 20 mm at a pressure of 2000 Kg/cm². The shaped body was then fired at 1050° to 1200 °C. for 2 hours and machined to prepare a spherical specimen with a diameter of 1.3 mm and a columnar specimen with a diameter of 1.3 mm and a length of 16 mm.

For each spherical specimen, measurements were made for saturation magnetization and Curie temperature (Tc) with a vibrating sample magnetometer. The ferromagnetic resonance line width ($\Delta H$) at 10 GHz was measured according to Japan Industrial Standard C-2561 method with a TE106 mode cavity resonator.

For each columnar specimen, measurements were made for the dielectric constant ($\epsilon$) and dielectric loss tangent ($\tan \delta e$) according to Japan Industrial Standard C-2561 method at 10 GHz in a TM010 mode cavity resonator by a method of perturbation.

For each specimen the dielectric constant ($\epsilon$) was in a range between 14 and 16.

The results are shown in Table 1. The specimens with an asterisk (*) are those out of the scope of the present invention, while the other specimens are those falling within the scope of the present invention defined in the ternary phase diagram of FIG. 1.

TABLE 1

| No. | $Li_xFe_yTi_zO_{0.5+y+1.5z}$ | | | PbO (mol %) | $4\pi Ms$ gauss | $\Delta H$ Oe | $\tan \delta e$ | Tc (°C.) |
|-----|------|-------|-------|------|------|-----|--------|-----|
|     | x    | y     | z     |      |      |     |        |     |
| 1*  | 0.15 | 0.85  | 0.00  | 0    | 3700 | 420 | 0.012  | 650 |
| 2   | "    | "     | "     | 0.01 | 3720 | 220 | 0.0032 | 660 |
| 3   | "    | "     | "     | 0.10 | 3720 | 160 | 0.0006 | 660 |
| 4   | "    | "     | "     | 0.50 | 3600 | 200 | 0.0010 | 650 |
| 5*  | "    | "     | "     | 1.00 | 3540 | 240 | 0.0096 | 650 |
| 6*  | 0.15 | 0.55  | 0.30  | 0.00 | 620  | 750 | 0.018  | 320 |
| 7   | "    | "     | "     | 0.01 | 650  | 420 | 0.0065 | 320 |
| 8   | "    | "     | "     | 0.10 | 680  | 380 | 0.0032 | 330 |
| 9   | "    | "     | "     | 0.50 | 680  | 400 | 0.0041 | 310 |
| 10* | "    | "     | "     | 1.00 | 640  | 450 | 0.0045 | 310 |
| 11* | 0.30 | 0.55  | 0.15  | 0.00 | 850  | 440 | 0.014  | 330 |
| 12  | "    | "     | "     | 0.01 | 850  | 300 | 0.0022 | 340 |
| 13  | "    | "     | "     | 0.10 | 880  | 190 | 0.0006 | 350 |
| 14  | "    | "     | "     | 0.50 | 860  | 200 | 0.0009 | 350 |
| 15* | "    | "     | "     | 1.00 | 820  | 320 | 0.0033 | 350 |
| 16* | 0.30 | 0.70  | 0.00  | 0.00 | 2520 | 720 | 0.022  | 370 |
| 17  | "    | "     | "     | 0.01 | 2540 | 380 | 0.0024 | 390 |
| 18  | "    | "     | "     | 0.10 | 2540 | 260 | 0.0025 | 390 |
| 19  | "    | "     | "     | 0.50 | 2490 | 280 | 0.0028 | 390 |
| 20* | "    | "     | "     | 1.00 | 2480 | 280 | 0.0050 | 390 |
| 21* | 0.21 | 0.725 | 0.075 | 0.00 | 2780 | 510 | 0.0092 | 540 |
| 22  | "    | "     | "     | 0.01 | 2800 | 290 | 0.0012 | 540 |
| 23  | "    | "     | "     | 0.10 | 2840 | 150 | 0.0006 | 560 |
| 24  | "    | "     | "     | 0.50 | 2840 | 190 | 0.0022 | 560 |
| 25* | "    | "     | "     | 1.00 | 2800 | 320 | 0.0028 | 560 |
| 26* | 0.25 | 0.625 | 0.125 | 0.00 | 1800 | 460 | 0.0088 | 520 |
| 27  | "    | "     | "     | 0.01 | 1820 | 280 | 0.0009 | 520 |
| 28  | "    | "     | "     | 0.10 | 1780 | 180 | 0.0005 | 520 |
| 29  | "    | "     | "     | 0.50 | 1780 | 180 | 0.0020 | 530 |
| 30* | "    | "     | "     | 1.00 | 1750 | 220 | 0.0032 | 540 |
| 31* | 0.10 | 0.75  | 0.15  | 0.00 | 1860 | 920 | 0.025  | 470 |
| 32* | "    | "     | "     | 0.10 | 1900 | 560 | 0.0068 | 450 |
| 33* | 0.25 | 0.50  | 0.25  | 0.00 | 680  | 480 | 0.018  | 80  |
| 34* | "    | "     | "     | 0.10 | 690  | 320 | 0.0088 | 100 |
| 35* | 0.35 | 0.60  | 0.05  | 0.00 | 1920 | 880 | 0.020  | 280 |

TABLE 1-continued

| No. | $Li_xFe_yTi_zO_{0.5+y+1.5z}$ | | | PbO (mol %) | 4πMs gauss | ΔH Oe | tan δe | Tc (°C.) |
|---|---|---|---|---|---|---|---|---|
| | x | y | z | | | | | |
| 36* | " | " | " | 0.10 | 1980 | 610 | 0.0072 | 290 |

As can be understood from the data for specimen Nos. 1, 6, 11, 16, 21 and 26, the ferromagnetic resonance line width (ΔH) and the dielectric loss tangent (tan δe) were no improved by the addition of PbO when it was present in amounts less than 0.01 mol %. This makes it impossible to use such a material in the production of practical high-frequency circuit elements. From the data for specimen Nos. 5, 10, 15, 20, 25 and 30, it will be understood that the dielectric loss tangent (tan δe) increases if the added amount of PbO exceeds 0.5 mol %.

Further, the data for the specimen Nos. 31, 32, 35 and 36 teach that the ferromagnetic resonance line width (ΔH) and the dielectric loss tangent (tan δe) become large the mole fraction of Li is less than 0.15, or when the mole fraction of Li exceeds 0.30. The data for the specimen Nos. 33 and 34 teach that when the mole fraction of Fe is less than 0.55, the ferromagnetic resonance line width (ΔH) and the dielectric loss tangent (tan δe) become large. In addition, the Curie temperature becomes lowered, resulting in the increase of the temperature coefficient of saturation magnetization.

From the data shown in Table 1, any desired value of the saturation magnetization (4πMs) within the range of 600 to 3720 gauss can be obtained by replacing a part of Fe with titanium. However, if the mole fraction of titanium is more than 0.30, the saturation magnetization (4πMs) becomes too small.

EXAMPLE 2

Using highly purified, $Li_2Fe_2O_3$, TiO and $V_2O_5$ as raw materials, spherical and columnar specimens, were prepared in the same manner as Example 1 each having a composition shown in Table 2.

For each specimen, the saturation magnetization, (4πMs), Curie temperature (Tc), ferromagnetic resonance line width (ΔH) at 10 GHz, dielectric constant (ε) and dielectric loss tangent (tan δe) at 10 GHz were measured in the same manner as in Example 1. For each specimen, the dielectric constant (ε) was in a range between 14 and 16. The results are shown in Table 2.

In Table 2, the specimens with an asterisk (*) are those having a composition out of the scope of the present invention, while the other specimens are those having a composition within the scope of the present invention.

TABLE 2

| No. | $Li_xFe_yTi_zO_{0.5+y+1.5z}$ | | | $V_2O_5$ (mol %) | 4πMs gauss | ΔH Oe | tan δe | Tc (°C.) |
|---|---|---|---|---|---|---|---|---|
| | x | y | z | | | | | |
| 37* | 0.15 | 0.85 | 0.00 | 0 | 3700 | 420 | 0.012 | 650 |
| 38 | " | " | " | 0.01 | 3710 | 310 | 0.0039 | 640 |
| 39 | " | " | " | 0.2 | 3680 | 200 | 0.0008 | 640 |
| 40 | " | " | " | 1.0 | 3560 | 240 | 0.0012 | 640 |
| 41* | " | " | " | 2.0 | 3380 | 300 | 0.011 | 630 |
| 42* | 0.15 | 0.55 | 0.30 | 0 | 620 | 750 | 0.018 | 320 |
| 43 | " | " | " | 0.01 | 630 | 430 | 0.0072 | 330 |
| 44 | " | " | " | 0.2 | 650 | 370 | 0.0031 | 320 |
| 45 | " | " | " | 1.0 | 650 | 390 | 0.0045 | 320 |
| 46* | " | " | " | 2.0 | 640 | 460 | 0.0059 | 310 |
| 47* | 0.30 | 0.55 | 0.15 | 0 | 850 | 440 | 0.014 | 330 |
| 48 | " | " | " | 0.01 | 860 | 330 | 0.0030 | 330 |
| 49 | " | " | " | 0.2 | 880 | 200 | 0.0009 | 330 |

TABLE 2-continued

| No. | $Li_xFe_yTi_zO_{0.5+y+1.5z}$ | | | $V_2O_5$ (mol %) | 4πMs gauss | ΔH Oe | tan δe | Tc (°C.) |
|---|---|---|---|---|---|---|---|---|
| | x | y | z | | | | | |
| 50 | " | " | " | 1.0 | 870 | 220 | 0.0015 | 350 |
| 51* | " | " | " | 2.0 | 810 | 340 | 0.0044 | 360 |
| 52* | 0.30 | 0.70 | 0.00 | 0 | 2520 | 720 | 0.022 | 370 |
| 53 | " | " | " | 0.01 | 2530 | 350 | 0.0030 | 380 |
| 54 | " | " | " | 0.2 | 2560 | 260 | 0.0023 | 380 |
| 55 | " | " | " | 1.0 | 2580 | 260 | 0.0025 | 370 |
| 56* | " | " | " | 2.0 | 2460 | 310 | 0.0046 | 370 |
| 57* | 0.21 | 0.725 | 0.075 | 0 | 2780 | 510 | 0.0092 | 540 |
| 58 | " | " | " | 0.01 | 2810 | 320 | 0.0014 | 560 |
| 59 | " | " | " | 0.2 | 2820 | 180 | 0.0008 | 560 |
| 60 | " | " | " | 1.0 | 2840 | 210 | 0.0026 | 540 |
| 61* | " | " | " | 2.0 | 2780 | 350 | 0.0040 | 540 |
| 62* | 0.25 | 0.625 | 0.125 | 0 | 1800 | 460 | 0.0088 | 520 |
| 63 | " | " | " | 0.01 | 1830 | 260 | 0.0014 | 520 |
| 64 | " | " | " | 0.2 | 1830 | 190 | 0.0008 | 520 |
| 65 | " | " | " | 1.0 | 1810 | 220 | 0.0018 | 500 |
| 66* | " | " | " | 2.0 | 1720 | 250 | 0.0036 | 490 |
| 67* | 0.10 | 0.75 | 0.15 | 0 | 1860 | 920 | 0.025 | 470 |
| 68* | " | " | " | 0.2 | 1880 | 620 | 0.0088 | 460 |
| 69* | 0.25 | 0.50 | 0.25 | 0 | 680 | 480 | 0.018 | 80 |
| 70* | " | " | " | 0.2 | 750 | 420 | 0.011 | 110 |
| 71* | 0.35 | 0.60 | 0.05 | 0 | 1920 | 880 | 0.020 | 280 |
| 72* | " | " | " | 0.2 | 2020 | 710 | 0.010 | 280 |

From the data shown in Table 2, it can be seen that the magnetic material containing less than 0.01 mol % of $V_2O_5$, such as specimen Nos. 37, 42, 47, 52, 57 and 62, possesses large values of ΔH and tan δe, thus making it impossible to be used for practical applications. On the other hand, the magnetic material containing more than 1.0 mol % of $V_2O_5$, such as specimen Nos. 41, 46, 51, 56, 61 and 66, possesses large tan δe.

In contrast therewith, the specimens of the present invention are considerably improved in ΔH and tan δe by incorporating not less than 0.01 mol % to not more than 1.0 mol % of $V_2O_5$ into the basic composition.

Further, the data for specimen Nos. 67, 68, 71 and 72 show that when the mole fraction of Li is less than 0.15 or exceeds 0.30, ΔH and tan δe become large. Also, the data for the specimen Nos. 69 and 70 show that when the mole fraction of Fe is less than 0.55, ΔH and tan δe become large and the Curie temperature becomes considerably lower.

According to the present invention, it is possible to produce a magnetic material with any desired value of 4πMs ranging from about 700 to 3720 gauss by replacing a part of Fe with titanium. However, if the mole fraction of titanium is more than 0.30, 4πMs is considerably decreased.

EXAMPLE 3

Using highly purified, $Li_2CO_3$, $Fe_2O_3$, $TiO_2$ and $B_2O_3$ and $SiO_2$ as raw materials, spherical and columnar specimens, were prepared in the same manner as Example 1 each having a composition shown in Table 3.

For each specimen, the saturation magnetization, (4πMS), Curie temperature (Tc), ferromagnetic resonance line width (ΔH) at 10 GHz, dielectric constant (ε) and dielectric loss (tan δe) at 10 GHz were measured in the same manner as in Example 1. For each specimen, the dielectric constant (ε) was in a range between 14 and 16. The results are shown in Table 3.

In Table 3, the specimens with an asterisk (*) are those having a composition out of the scope of the present invention, while the other specimens are those having a composition within the scope of the present invention.

TABLE 3

| No. | $Li_xFe_yTi_zO_{0.5+y+1.5z}$ | | | $B_2O_3$ (mol %) | $SiO_2$ (mol %) | $4\pi Ms$ gauss | $\Delta H$ Oe | tan δe | Tc (°C.) |
|---|---|---|---|---|---|---|---|---|---|
| | x | y | z | | | | | | |
| 73* | 0.15 | 0.85 | 0.00 | 0 | 0 | 3700 | 420 | 0.012 | 650 |
| 74 | " | " | " | 0.01 | 0.01 | 3690 | 250 | 0.0027 | 650 |
| 75 | " | " | " | 0.1 | 0.1 | 3670 | 180 | 0.0008 | 640 |
| 76 | " | " | " | 1.0 | 0 | 3640 | 280 | 0.0034 | 650 |
| 77 | " | " | " | 0 | 1.0 | 3550 | 260 | 0.0032 | 640 |
| 78* | " | " | " | 1.0 | 1.0 | 3430 | 370 | 0.010 | 630 |
| 79* | 0.15 | 0.55 | 0.30 | 0 | 0 | 620 | 750 | 0.018 | 320 |
| 80 | " | " | " | 0.01 | 0.01 | 620 | 380 | 0.0046 | 320 |
| 81 | " | " | " | 0.1 | 0.1 | 620 | 340 | 0.0015 | 310 |
| 82 | " | " | " | 1.0 | 0 | 600 | 410 | 0.0035 | 310 |
| 83 | " | " | " | 0 | 1.0 | 630 | 390 | 0.0032 | 320 |
| 84* | " | " | " | 1.0 | 1.0 | 610 | 520 | 0.0072 | 320 |
| 85* | 0.30 | 0.55 | 0.15 | 0 | 0 | 850 | 440 | 0.014 | 330 |
| 86 | " | " | " | 0.01 | 0.01 | 840 | 260 | 0.0025 | 340 |
| 87 | " | " | " | 0.1 | 0.1 | 840 | 190 | 0.0008 | 330 |
| 88 | " | " | " | 1.0 | 0 | 830 | 300 | 0.0022 | 310 |
| 89 | " | " | " | 0 | 1.0 | 850 | 280 | 0.0018 | 330 |
| 90* | " | " | " | 1.0 | 1.0 | 800 | 400 | 0.0042 | 340 |
| 91* | 0.30 | 0.70 | 0.00 | 0 | 0 | 2520 | 720 | 0.022 | 370 |
| 92 | " | " | " | 0.01 | 0.01 | 2540 | 320 | 0.0022 | 380 |
| 93 | " | " | " | 0.1 | 0.1 | 2540 | 250 | 0.0014 | 350 |
| 94 | " | " | " | 1.0 | 0 | 2510 | 340 | 0.0032 | 350 |
| 95 | " | " | " | 0 | 1.0 | 2540 | 310 | 0.0026 | 370 |
| 96* | " | " | " | 1.0 | 1.0 | 2490 | 420 | 0.0044 | 380 |
| 97* | 0.20 | 0.725 | 0.075 | 0 | 0 | 2780 | 510 | 0.0092 | 540 |
| 98 | " | " | " | 0.01 | 0.01 | 2800 | 280 | 0.0009 | 540 |
| 99 | " | " | " | 0.1 | 0.1 | 2760 | 200 | 0.0006 | 540 |
| 100 | " | " | " | 1.0 | 0 | 2750 | 240 | 0.0025 | 520 |
| 101 | " | " | " | 0 | 1.0 | 2760 | 250 | 0.0021 | 530 |
| 102* | " | " | " | 1.0 | 1.0 | 2720 | 380 | 0.0068 | 520 |
| 103* | 0.25 | 0.625 | 0.125 | 0 | 0 | 1800 | 460 | 0.0088 | 520 |
| 104 | " | " | " | 0.01 | 0.01 | 1780 | 240 | 0.0011 | 520 |
| 105 | " | " | " | 0.1 | 0.1 | 1780 | 170 | 0.0008 | 520 |
| 106 | " | " | " | 1.0 | 0 | 1750 | 260 | 0.0014 | 510 |
| 107 | " | " | " | 0 | 1.0 | 1790 | 230 | 0.0014 | 510 |
| 108* | " | " | " | 1.0 | 1.0 | 1730 | 300 | 0.0035 | 500 |
| 109* | 0.10 | 0.75 | 0.15 | 0 | 0 | 1860 | 920 | 0.025 | 470 |
| 110* | " | " | " | 0.1 | 0.1 | 1900 | 710 | 0.0072 | 450 |
| 111* | 0.25 | 0.50 | 0.25 | 0 | 0 | 680 | 480 | 0.018 | 80 |
| 112* | " | " | " | 0.1 | 0.1 | 780 | 400 | 0.0095 | 90 |
| 113* | 0.35 | 0.60 | 0.05 | 0 | 0 | 1920 | 880 | 0.020 | 280 |
| 114* | " | " | " | 0.1 | 0.1 | 1980 | 670 | 0.012 | 260 |

From the data shown in Table 3, it can be seen that the composition containing less than 0.02 mol % of $B_2O_3$ and/or $SiO_2$, such as specimen Nos. 73, 79, 85, 91, 97 and 103 possess large values of $\Delta H$ and tan δe, thus making it impossible to be used for practical applications. The composition containing more than 1.0 mol % of 0.02 mol % of $B_2O_3$ and/or $SiO_2$, such as specimen Nos. 78, 84, 90, 96, 102 and 108, possess large tan δe. Further, specimen Nos. 109, 110, 113 and 114 possess large values of $\Delta H$ and tan δe when the mole fraction of Li is less than 0.15 or exceeds 0.30. Specimen Nos. 111 and 112 possess large values of $\Delta H$ and tan δe and have considerably lower Curie temperature as the mole fraction of Fe is less than 0.55.

In contrast therewith, the magnetic material having the composition falling in the scope of the present invention is considerably improved in $\Delta H$ and tan δe by incorporating not less than 0.01 mol % to not more than 1.0 mol % of $B_2O_3$ and/or $SiO_2$. In addition, the present invention makes it possible to produce a magnetic material with any desired value of $4\pi Ms$ ranging from about 600 to 3700 gauss by replacing a part of Fe with titanium. However, excess replacement of titanium lowers $4\pi Ms$ considerably.

What is claimed is:

1. A magnetic material for microwave and millimeter wave frequencies consisting essentially of a basic composition and an additive incorporated therein, said basic composition being represented by the general formula:

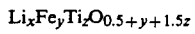

$$Li_xFe_yTi_zO_{0.5+y+1.5z}$$

wherein x, y and z are mol fractions and are within the following ranges $0.15 \leq x \leq 0.30$, $0.55 \leq y \leq 0.85$, $0 \leq z \leq 0.30$, wherein $x+y+z=1.00$, said additive being lead oxide which is present in a range of from 0.01 mol % to 0.5 mol %.

* * * * *